United States Patent
Choudhary et al.

(10) Patent No.: US 6,432,376 B1
(45) Date of Patent: Aug. 13, 2002

(54) MEMBRANE PROCESS FOR THE PRODUCTION OF HYDROGEN PEROXIDE BY NON-HAZARDOUS DIRECT OXIDATION OF HYDROGEN BY OXYGEN USING A NOVEL HYDROPHOBIC COMPOSITE PD-MEMBRANE CATALYST

(75) Inventors: Vasant Ramchandra Choudhary; Subhash Dwarkanath Sansare; Abaji Govind Gaikwad, all of Pune (IN)

(73) Assignee: Council of Scientific & Industrial Research (IN)

( * ) Notice: Subject to any disclaimer, the term of this patent is extended or adjusted under 35 U.S.C. 154(b) by 119 days.

(21) Appl. No.: 09/655,970

(22) Filed: Sep. 5, 2000

(51) Int. Cl.⁷ .............................................. C01B 15/01
(52) U.S. Cl. ............................ 423/584; 502/4; 502/339
(58) Field of Search ................................. 423/584, 587; 502/4, 339

(56) References Cited

U.S. PATENT DOCUMENTS

| | | | |
|---|---|---|---|
| 4,393,038 A | 7/1983 | Sun et al. ................... | 423/584 |
| 4,832,938 A | 5/1989 | Gosser et al. ............... | 423/584 |
| 5,169,618 A | 12/1992 | Maraschino ................ | 423/584 |
| 5,399,334 A | 3/1995 | Kawakami et al. ......... | 423/584 |
| 5,505,921 A * | 4/1996 | Luckoff et al. ............. | 423/584 |

FOREIGN PATENT DOCUMENTS

| | | | | |
|---|---|---|---|---|
| DE | 4127918 A1 | 10/1992 | ......... | C01B/15/029 |
| EP | 0504741 A1 | 9/1992 | ......... | C01B/15/029 |
| EP | 0621235 A1 | 10/1994 | ......... | C01B/15/029 |
| JP | 001133909 | 5/1989 | ......... | C01B/15/029 |
| WO | WO93/14025 | 7/1993 | ......... | C01B/15/029 |
| WO | WO94/12428 | 6/1994 | ......... | C01B/15/029 |

OTHER PUBLICATIONS

L. Fu et al., Stud. Surf. Sci. Catal., 72 (1992) 33–41.
S. Umiya et al., Journal of Membrane Science, vol. 56, pp. 303–313; 315–325 (1991).

* cited by examiner

Primary Examiner—Steven P. Griffin
Assistant Examiner—Maribel Medina
(74) Attorney, Agent, or Firm—Samuels, Gauthier & Stevens

(57) ABSTRACT

The above objects are achieved by providing a novel process for the production of hydrogen peroxide, by the non-hazardous direct oxidation of hydrogen by oxygen to hydrogen peroxide, without the formation of an explosive $H_2$ and $O_2$ gas mixture, using a novel tubular hydrophobic composite Pd-membrane catalyst, represented by a formula:

$$HPM\ (c)/SOMF\ (b)/M_xPd_{1-x}(a)/IPM$$

Wherein: IPM is an inorganic porous membrane, permeable to all gases and vapors, in a form of tube having a thickness of at least 0.5 mm and internal diameter of at least 0.6 cm; $M_xPd_{1-x}$ is a metal alloy, permeable only to hydrogen gas, deposited on the inner side of IPM; Pd is a palladium metal; M is a metal selected from copper, silver, gold, noble metals other than palladium, or a mixture of two or more thereof; x is a mole fraction of the metal M in the metal alloy ($M_xPd_{1-x}$) in the range from about 0.03 to about 0.6; (a) is a weight of the metal alloy per unit area of IPM in the range from about 5.0 g.m$^{-2}$ to about 500 g.m$^{-2}$; SOMF is a surface oxidized thin metal film comprising palladium which is permeable only to hydrogen, deposited on the metal alloy ($M_xPd_{1-x}$); (b) is a thickness of SOMF in the range from about 0.05 μm to about 5.0 μm; HPM is a hydrophobic polymer membrane permeable to hydrogen and oxygen gases and also to vapors of water and hydrogen peroxide but not to liquid water or aqueous solution; and (c) is a weight of the HPM per unit area of SOMF in the range from about 0.2 g.m$^{-2}$ to about 40 g.m$^{-2}$.

14 Claims, No Drawings

MEMBRANE PROCESS FOR THE PRODUCTION OF HYDROGEN PEROXIDE BY NON-HAZARDOUS DIRECT OXIDATION OF HYDROGEN BY OXYGEN USING A NOVEL HYDROPHOBIC COMPOSITE PD-MEMBRANE CATALYST

FIELD OF THE INVENTION

This invention relates to a novel membrane process for the production of hydrogen peroxide by non-hazardous direct oxidation of hydrogen by oxygen, without the formation of an explosive hydrogen and oxygen gas mixture, using a novel hydrophobic composite Pd-membrane catalyst.

The membrane process of this invention is capable of being used in the chemical industries for the production of hydrogen peroxide by the direct oxidation of hydrogen by oxygen to hydrogen peroxide, which is an environmentally clean process, in a safe manner without any chance of forming hazardous explosive hydrogen-oxygen or air mixture.

BACKGROUND OF THE INVENTION

Currently most widely practiced commercial scale production of hydrogen peroxide is based on an auto oxidation process employing alkyl anthraquinone as the working material. This process involves reduction of alkyl anthraquinone dissolved in an organic working solution to alkyl anthraquinol. The alkyl anthraquinol is oxidized by air to produce alkyl anthraquinone, which is recycled in this process, and hydrogen peroxide. This process comprises a number of operations involving reduction, oxidation, and separation by aqueous extractions, refining and concentration, making the process complex. Apart from the requirements of high capital and operation costs, this process has following limitations and disadvantages:

- Non-selective in hydrogenation, hence loss of anthraquinone.
- Difficulties in separation of hydrogenation catalyst and degradation products.
- Need for the regeneration of used hydrogenation catalyst.
- Need for the removal of organic matters from the extracted $H_2O_2$ solution.
- Waste treatment and disposal of undesired side products of the cyclic process. Hence there is great need for developing an environ friendly process for $H_2O_2$ production.

PRIOR ART REFERENCES

Since the disclosure in U.S. Pat. No. 1,108,752 by Henkel et al. that palladium is a catalyst promoting the formation of hydrogen peroxide and water from a mixture of hydrogen and oxygen, a number of palladium containing catalysts, useful for the direct oxidation of hydrogen by oxygen to hydrogen peroxide, have been disclosed by many inventors.

Direct Oxidation of $H_2$ by $O_2$ to Hydrogen Peroxide over Hydrophillic Pd-Catalysts Using a Mixed Feed of $H_2$ and $O_2$ U.S. Pat. No. 4,832,938 by Gosser et al. disclosed a Pt—Pd bimetallic catalyst supported on a carbon, silica or alumina support for making hydrogen peroxide from direct combination of hydrogen and oxygen in an aqueous reaction medium. Later, a German patent Ger. Offen. DE 4,127,918 A1 by Lueckoff et al. disclosed a supported palladium gold catalyst for the manufacture of hydrogen peroxide from hydrogen and oxygen in aqueous medium; the catalyst contains 5–95 wt % Au and is supported on carbon. A number of platinum Group metal containing catalysts: (1) Pt-Group metal on high surface area support, such as carbon, silica or alumina (Ref. U.S. Pat. No. 5,169,618); (2) Pt-Group catalyst on solid acid carrier (Ref. Eur. Pat. Appl. EP 504,741, A1); (3) Pt-Group element supported on Nb- or Ta oxide (Ref. PCT Int. Appl. WO 9,412,428 A1); (4) Sn-modified Pt-Group metals supported on catalysts carriers (Ref. Eur. Pat. Appl. EP 621,235 A1); (5) Pt-Group metal catalyst supported on hydrophilic support (Ref. U.S. Pat. No. 5,399,334); for the oxidation of hydrogen to hydrogen peroxide are known in the prior art.

The above mentioned Pd- or Pt-Group metal containing catalysts are hydrophilic in nature, and hence the aqueous reaction medium used in the oxidation of hydrogen to hydrogen peroxide over these catalysts is in close contact with the catalyst surface. Because of the close contact between the catalyst and the reaction medium, the hydrogen peroxide, which is formed by the reaction between hydrogen and oxygen on the catalyst and then absorbed in the reaction medium due to the high affinity between hydrogen peroxide and water, is readsorbed on the catalyst from the reaction medium and converted to water and oxygen, and thereby the selectivity for hydrogen peroxide in the process is drastically reduced, when the above mentioned catalysts are used in the oxidation of hydrogen to hydrogen peroxide. Earlier, Fu et al. has also found that only the Pd catalysts supported on hydrophobic carbon support are selective towards hydrogen peroxide formation in the oxidation of hydrogen [Ref. L. Fu et al., Stud. Surf. Sci. Catal., 72(1992)33–41].

Direct Oxidation of $H_2$ by $O_2$ to Hydrogen Peroxide over Hydrophobic Pd-Catalysts Using a Mixed Feed of $H_2$ and $O_2$ A few Pt-Group or Group VIII metal catalysts deposited on hydrophobic support, useful for the oxidation of hydrogen to hydrogen peroxide, are also known in the prior art.

A Japanese patent Jpn. Kokai Tokyo Koho JP 01133909 A2 by Kyora disclosed a Pt-Group metal catalyst carried on a hydrophobic support such as porous and hydrophobic Teflon support. Chuang in an European patent EP 3660419 A1 disclosed a Group VIII metal catalyst deposited on a hydrophobic support for the manufacture of hydrogen peroxide by reacting hydrogen with oxygen in an aqueous medium. Later, Chuang has disclosed a Group VIII metal on a partially hydrophobic and partially hydrophilic support, such as Pd on fluorinated carbon, as a catalyst for the oxidation of hydrogen to hydrogen peroxide, in PCT Int. Appl. WO 9314025 A1.

Although, the hydrophobic support used in these catalysts provides some hydrophobic character to the Pd- or Group VIII metal catalysts, there are following disadvantages and limitations of the use of hydrophobic support for depositing the metal catalysts: 1) It is difficult to deposit catalytically active components from aqueous solution on a hydrophobic support as there is no wetting of the surface of hydrophobic support by aqueous solution. 2) Hydrophobic support, such as teflon and other hydrophobic polymer support, is thermally unstable at the calcination temperatures, above 300° C., normally employed for decomposing the precursor compounds of catalytically active components of the catalyst. 3) Because of the deposition of catalytically active components, which are hydrophilic in nature, on hydrophobic support, the hydrophobic character of the support is lost completely or at least partially.

Apart form the above mentioned disadvantages and/or limitations, the most important disadvantage of the prior art processes using the above mentioned hydrophobic and hydrophillic catalysts for the direct oxidation of hydrogen by oxygen to hydrogen peroxide in a high pressure slurry reactor is that the feed oxygen and hydrogen gases are mixed before or during the reaction. Since hydrogen when mixed with oxygen or air forms an explosive or a flammable mixture for a very wide range of hydrogen concentration in both oxygen and air, the above mentioned prior art processes are highly hazardous, particularly at the high pressure used in the prior art process. Flammability limits of hydrogen in oxygen and air at the atmospheric pressure are as follows: 4.0–94% $H_2$ in oxygen, and 4.0 to 75.0% $H_2$ in air. The flammability limits are widen with increasing the pressure.

The explosion hazards in the direct oxidation of hydrogen by oxygen to hydrogen peroxide can be totally eliminated if the direct mixing of feed hydrogen and oxygen gases and/or the formation of $H_2$—$O_2$ or air mixture during the reaction are avoided by some means.

Non-hazardous Direct Oxidation of $H_2$ by $O_2$ to Hydrogen Peroxide Using Pd-Membrane Catalyst In order to avoid the explosion hazards due to the formation of explosive hydrogen-oxygen or air mixture, a use of Pd metallic membrane catalyst for the oxidation of hydrogen by oxygen to hydrogen peroxide has also been disclosed in the prior art.

U.S. Pat. No. 4,393,038, Jul. 12, 1983) discloses hydrogen peroxide production process in which hydrogen is diffused through a palladium metallic membrane permeable to hydrogen, preferably a gold plated palladium-silver metallic alloy membrane tube, into an aqueous solution containing ions of a stabilizing nature and dissolved oxygen to form hydrogen peroxide and water as a by product. In this process, the membrane used for hydrogen diffusion is a Pd-containing metallic tube, which is self supporting with thickness high enough to avoid collapse of the metallic structure. For the high thickness Pd metallic membrane tube, the flux of hydrogen diffusion through the Pd-membrane is extremely small and hence not of practical interest for producing hydrogen peroxide. Moreover, palladium-silver alloy and gold platted palladium or palladium-silver alloy catalyst membrane of this process have extremely poor selectivity for the oxidation of hydrogen to hydrogen peroxide; the selectivity of hydrogen peroxide, based upon the amount of hydrogen consumed was reported to be 1.44% and less than 1.0%, when the Pd-containing metallic membrane tube was pretreated with stannic chloride followed by hydrolysis and without the pretreatment, respectively. Such a low hydrogen peroxide selectivity is not of practical interest.

Palladium-Group IB metal, such as copper and silver, metallic alloy in a form of thin film supported on inorganic porous membrane for hydrogen separation from $H_2$ containing gases are also known in the prior art (ref. S.Umiya et.al. Journal of Membrane Science, Vol. 56, pages 303–313 and 315–325 year 1991). However, because of their extremely poor selectivity or yield for hydrogen peroxide, Pd–Ag or Cu metal alloy membrane supported on an inorganic porous membrane are not suitable as membrane catalyst for the direct oxidation of hydrogen to hydrogen peroxide. A membrane catalyst containing pure palladium metallic membrane also cannot be useful for the direct oxidation of hydrogen to hydrogen peroxide because of its structural instability well known in the prior art. When a pure palladium membrane is operated below 300° C. in hydrogen, β-phase palladium hydride is formed, causing a phase transformation from α to β-hydride accompanied by discontinuous lattice expansion. This phase transformation leads to the formation of pinholes and ultimately to the rupture of the Pd-membrane, and consequently the permselectivity of the Pd-membrane for hydrogen is lost. The β-phase hydride formation is avoided or suppressed by alloying palladium with Group IB metals (ref. S.Umiya et.al. Journal of Membrane Science, Vol. 56, page 303–313 and 315–325 year 1991).

Because of the above mentioned disadvantages and/or limitations of the prior art processes for the direct oxidation of hydrogen to hydrogen peroxide for the production of hydrogen peroxide, there is a need for developing an improved membrane process for the non-hazardous direct oxidation of hydrogen to hydrogen peroxide, using a novel Pd-membrane catalyst which is stable in the atmosphere of hydrogen at below 100° C. without forming pinholes, has high rates of hydrogen permeation, and also has high selectivity or yield for hydrogen peroxide formation in the direct oxidation of hydrogen to hydrogen peroxide.

The applicants in their co-pending US application . . . filed on even date has disclosed a novel hydrophobic composite Pd-membrane catalyst, useful for non-hazardous direct oxidation of hydrogen by oxygen to hydrogen peroxide, represented by the formula:

$$HPM(c)/SOWF(b)/M_xPd_{1-x}(a)/IPM$$

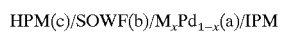

wherein, IPM is an inorganic porous membrane, permeable to all gases and vapors, in a form of tube having a thickness of at least 0.5 mm and internal diameter of at least 0.6 cm; $M_x Pd_{1-x}$ is a metal alloy, permeable only to hydrogen gas, deposited on the inner side of IPM; Pd is a palladium metal; M is a metal selected from copper, silver, gold, noble metals other than palladium, or a mixture of two or more thereof; x is a mole fraction of the metal M in the metal alloy $(M_xPd_{1-x})$ in the range of 0.03 to 0.6; a, is the weight of the metal alloy per unit area of IPM in the range of 5.0 g.m$^{-2}$ to 500 g.m$^{-2}$; SOMF is a surface oxidized thin metal film comprising palladium which is permeable only to hydrogen, deposited on the metal alloy $(M_x Pd_{1-x})$); b, is the thickness of SOMF in the range of 0.05 μm to 5.0 μm; HPM is a hydrophobic polymer membrane permeable to hydrogen and oxygen gases and also to vapors of water and hydrogen peroxide but not to liquid water or aqueous solution; and c, is the weight of the HPM per unit area of SOMF in the range of 0.2 g.m$^{-2}$ to 40 g.m$^{-2}$.

In the said co-pending application, the applicants also disclosed a process for the preparation of the novel hydrophobic composite Pd-membrane catalyst which overcomes the limitations of the prior art Pd-membrane catalyst, and is useful for the non-hazardous direct oxidation of hydrogen by oxygen to hydrogen peroxide.

The focus of this patent application, is to disclose the use this novel hydrophobic composite Pd-membrane catalyst for the production of hydrogen peroxide by non-hazardous direct oxidation of hydrogen by oxygen with high selectivity and productivity of hydrogen peroxide.

OBJECTS OF THE INVENTION

Accordingly, a main object of the present invention is to provide a membrane process for the production of hydrogen peroxide by non-hazardous direct oxidation of hydrogen by oxygen with high selectivity and productivity of hydrogen peroxide, using a novel composite Pd containing membrane catalyst represented by the formula HPM(c)/SOW (b)/$M_xPd_{1-x}$(a)/IPM;

which has been defined above and also claimed in the applicants co-pending U.S. application Ser. No. 09/655,978.

Another object of the invention is to provide a process for the production of hydrogen peroxide by non-hazardous direct oxidation of hydrogen by oxygen, using a novel hydrophobic composite Pd-membrane catalyst [disclosed in the applicants co-pending U.S. application Ser. No. 09/655, 978] having high stability, activity and selectivity in the direct oxidation of hydrogen by oxygen to hydrogen peroxide.

SUMMARY OF THE INVENTION

The above objects are achieved by providing a novel process for the production of hydrogen peroxide, by the non-hazardous direct oxidation of hydrogen by oxygen to hydrogen peroxide, without the formation of an explosive $H_2$ and $O_2$ gas mixture, using a novel tubular hydrophobic composite Pd-membrane catalyst, represented by a formula:

HPM(c)/SOMF(b)/$M_xPd_{1-x}$(a)/IPM

Wherein: IPM is an inorganic porous membrane, permeable to all gases and vapors, in a form of tube having a thickness of at least 0.5 mm and internal diameter of at least 0.6 cm; $M_x Pd_{1-x}$ is a metal alloy, permeable only to hydrogen gas, deposited on the inner side of IPM; Pd is a palladium metal; M is a metal selected from copper, silver, gold, noble metals other than palladium, or a mixture of two or more thereof; x is a mole fraction of the metal M in the metal alloy ($M_xPd_{1-x}$) in the range from about 0.03 to about 0.6; (a) is a weight of the metal alloy per unit area of IPM in the range from about 5.0 g.m$^{-2}$ to about 500 g.m$^{-2}$; SOMF is a surface oxidized thin metal film comprising palladium which is permeable only to hydrogen, deposited on the metal alloy ($M_x Pd_{1-x}$); (b) is a thickness of SOMF in the range from about 0.05 µm to about 5.0 µm; HPM is a hydrophobic polymer membrane permeable to hydrogen and oxygen gases and also to vapors of water and hydrogen peroxide but not to liquid water or aqueous solution; and (c) is a weight of the HPM per unit area of SOMF in the range from about 0.2 g.m$^{-2}$ to about 40 g.m$^{-2}$.

DETAILED DESCRIPTION OF INVENTION

Accordingly, the present invention provides a process for the production of hydrogen peroxide, by the non-hazardous direct oxidation of hydrogen by oxygen to hydrogen peroxide, without the formation of an explosive $H_2$ and $O_2$ gas mixture, using a novel tubular hydrophobic composite Pd-membrane catalyst, represented by a formula:

HPM(c)/SOMF(b)/$M_xPd_{1-x}$(a)/IPM wherein, IPM is an inorganic porous membrane, permeable to all gases and vapors, in a form of tube having a thickness of at least 0.5 mm and internal diameter of at least 0.6 cm; $M_x Pd_{1-x}$ is a metal alloy, permeable only to hydrogen gas, deposited on the inner side of IPM; Pd is a palladium metal; M is a metal other than palladium, or a mixture of two or more metals; x is a mole fraction of the metal M in the metal alloy ($M_xPd_{1-x}$) in the range from about 0.03 to about 0.6; (a) is a weight of the metal alloy per unit area of IPM in the range from about 5.0 g.m$^{-2}$ to about 500 g.m$^{-2}$; SOMF is a surface oxidized thin metal film comprising palladium which is permeable only to hydrogen, deposited on the metal alloy ($M_x Pd_{1-x}$); (b) is the thickness of SOMF in the range from about 0.05 µm to about 5.0 µm ; HPM is a hydrophobic polymer membrane permeable to hydrogen and oxygen gases and also to vapors of water and hydrogen peroxide but not to liquid water or aqueous solution; and (c) is a weight of the HPM per unit area of SOMF in the range from about 0.2 g.m$^{-2}$ to about 40 g.m$^{-2}$; said process being conducted in a membrane reactor comprising two zones: a gas zone and a liquid medium zone, separated from each other by the membrane catalyst; the process comprises:

(i) pretreating insitu the tubular hydrophobic composite Pd-membrane catalyst from its HPM side with a gaseous oxidizing agent, selected from oxygen, nitrous oxide, hydrogen peroxide vapours or a mixture thereof, at a temperature below about 200° C. for a period at least about 0.5 h; and (ii) contacting simultaneously 1) a hydrogen gas, at a pressure above about 1.0 atm from the gas zone of the membrane reactor with the tubular composite membrane catalyst from its IPM (inorganic porous membrane) side and 2) an aqueous reaction medium which is an aqueous solution comprising a mineral acid, while bubbling continuously a oxygen containing gas at a gas hourly space velocity in the range from about 10 h$^{-1}$ to about 10,000 h$^{-1}$ at a pressure above about 1.0 atm, with the tubular composite membrane catalyst from its HPM (hydrophobic polymer membrane) side, in two separate compartments separated by the tubular composite membrane catalyst, which is permeable only to hydrogen, such that the pressure drop across the tubular composite membrane catalyst is less than about 5.0 atm, in the membrane reactor comprising single or multiple membrane catalyst tubes, and operating the membrane reactor as a batch reactor with respect to the aqueous reaction medium with an external recirculation of the aqueous reaction medium in the membrane reactor for a period more than about 1.0 h or operating the membrane reactor as a continuous flow reactor with respect to the aqueous reaction medium at a liquid hourly space velocity in the range from about 0.01 h$^{-1}$ to about 100 h$^{-1}$, with or without external recirculation of the aqueous reaction medium, at a temperature below about 75° C., such that the hydrogen permeated through the composite Pd-membrane catalyst reacts with the dissolved oxygen from the aqueous reaction medium on the surface of the palladium oxide at the interface between SOMF and HPM of the composite Pd-membrane catalyst to produce hydrogen peroxide, which is absorbed in the aqueous reaction medium, producing an aqueous hydrogen peroxide solution.

In the process of this invention, M is a metal selected from copper, silver, gold, ruthenium, noble metals except palladium or a mixture of two or more thereof In the process of this invention, hydrogen peroxide is a desired product and water is a side product produced in the oxidation of hydrogen by oxygen.

The pretreatment step (step-i) of the process of this invention is essential for oxidizing unoxidized surface palladium metal present in the surface oxidized metal film (SOMF) of said novel hydrophobic composite Pd-membrane catalyst. On metallic palladium, nitrous oxide or hydrogen peroxide undergoes decomposition forming surface palladium oxide (PdO) and molecular nitrogen ($N_2$) or water. Surface metallic palladium can also be oxidized to PdO by oxygen even at room temperature.

Because of the complete oxidation of all the surface palladium present in the SOMF to palladium oxide, the hydrogen peroxide selectivity in the direct oxidation of hydrogen to hydrogen peroxide in the process of this invention is high.

In the process of this invention, the aqueous reaction medium comprises a mineral acid. A number of mineral acids, such as $H_2SO_4$, HCl, $H_3PO_4$, $HNO_3$, $HClO_4$ and other mineral acids are known in the prior art. The concentration of mineral acids in the aqueous reaction medium of this invention may be above about 0.005 M. The aqueous reaction medium of this invention may contain different cations such as $H^+$, $Na^+$, $K^+$, and other metal cations, and anions, for example $Cl^{-1}$, $Br^{-1}$, $SO_4^{-2}$, $PO_4^{-3}$, $NO_3^{-1}$, and other anions. The reaction medium may contain a hydrogen peroxide stabilizer. A number of hydrogen peroxide stabilizers, for example tri-amino methylene phosphonic acid, 1-hydroxyethylidene-1,1-di phosphonic acid, ethylene diamine tetra methylene phosphonic acid or their sodium salt and sodium pyrophosphate, are known in the prior art. The concentration of the stabilizer in the aqueous reaction medium may be below about 100 ppm.

In the step-ii of the process of this invention, the membrane reactor is operated batch-wise with respect to hydrogen. Whereas, with respect to the aqueous reaction medium, the membrane reactor may be operated either batch-wise or continuously. When the membrane reactor is operated batch wise with respect to the aqueous reaction medium, the reaction medium is recirculated by any conventional methods such as using pumps with valves etc, Whereas when the membrane reactor is operated continuously with respect to the aqueous reaction medium, the reaction medium may or may not be recirculated. In either case of the operations of the membrane reactor, hydrogen from the hydrogen gas zone is transported by its diffusion through the inorganic porous membrane (IPM) followed by its selective permeation through the metal alloy and surface oxidized metal film (SOMF) of said membrane catalyst. The transported hydrogen reacts on the surface of the SOMF at the interface of the SOMF and HPM with the oxygen diffused from BPM, which is in contact with the reaction medium containing dissolved oxygen, to form hydrogen peroxide. After its formation, the hydrogen peroxide is diffused through the HPM and absorbed in the aqueous reaction medium. If desired, the hydrogen per oxide from the aqueous medium can be separated by any methods known per se such as heating or applying pressure, agitation or their combinations etc,.

In the process of this invention, the preferred gas hourly space velocity of the oxygen containing gas is in the range from about 50 $h^{-1}$ to about 1000 $h^{-1}$, the preferred oxygen containing gas is pure oxygen, air or oxygen enriched air; the preferred pressure drop across the composite membrane catalyst is less than about 3 atm; the preferred temperature is less than about 50° C.; and preferentially the membrane reactor is operaed continuously with respect to liquid reaction medium at the liquid hourly space velocity of the reaction medium in the range from about 0.1 $h^{-1}$ to about 10 $h^{-1}$.

In one embodiment of the invention, the gas hourly space velocity of the oxygen containing gas is in the range of 200 $h^{-1}$ to 820 $h^{-1}$.

In yet another embodiment, the temperature employed is in the range of 2 to 50° C. and the membrane is operated with respect to the liquid medium at the liquid hourly space velocity of the reaction medium is in the range of 0.1 $h^{-1}$ to 10.0 $h^{-1}$.

In still another embodiment, the hydrogen can be oxidised by oxygen to hydrogen per oxide with high selectivity (>75%) at a very high conversion of hydrogen (between 85–99.8%) without the formation of an explosive mixture Roles of the various components of said novel hydrophobic composite Pd-membrane catalyst are as follows:

The inorganic ceramic porous membrane tube is used as a porous support for giving mechanical strength to the composite Pd-membrane catalyst. It has high mechanical strength; it does not burst or undergo rupture when subjected to a pressure drop across the membrane of about at least 10 atm. It may consists of γ-alumina, α-alumina, $ZrO_2$, $TiO_2$, carbon, silica, other metal oxides, glass or a mixture of two or more thereof It may contain micropores (pore dia.: below 1 nm) or mesopores (pore dia.: 1 nm to 20 nm) or macro pores (pore dia.: 20 nm above) or a combination of two or more thereof.

The metal alloy is deposited on the inner side of the inorganic porous membrane (IPM) support tube for forming a continuous non-porous metal alloy film on the surface of the membrane support. The role of the metal alloy film is to allow hydrogen to permeate or diffuse selectively, without forming a β-palladium hydride phase, but not to allow to permeate any gas or compound other than hydrogen. The role of metal other than palladium in the metal alloy film is to avoid or drastically reduce the formation of β-palladium hydride phase and thereby increasing the stability of the metal film membrane against the formation of pinholes during its use in presence of hydrogen for the direct oxidation of hydrogen to hydrogen peroxide.

The presence of completely surface oxidized metal film (SOMF) is very critical for said composite Pd-membrane catalyst to be selective in the direct oxidation of hydrogen by oxygen to hydrogen peroxide. In the absence of SOMF (surface oxidized metal film), the selectivity of the membrane catalyst for the formation of $H_2O_2$ in the oxidation of $H_2$ is very poor.

The presence of the hydrophobic polymer membrane, HPM, which is permeable to normally gases and also vapors of water and hydrogen peroxide but not to liquid water or aqueous solution under the conditions employed in the process of this invention, on the SOMF (surface oxidized metal film) is also critical for obtaining high selectivity for hydrogen peroxide. Due to the presence of hydrophobic polymer membrane in the composite Pd-membrane catalyst, a higher selectivity for the $H_2O_2$ formation in the direct oxidation of hydrogen results from the fact that, the hydrogen peroxide formed in the oxidation of hydrogen by oxygen at the interface of SOMF and the hydrophobic polymer membrane, HPM. This hydrogen per oxide is immediately absorbed in the aqueous reaction medium in contact with HPM, because of the strong affinity of hydrogen peroxide with water, but once absorbed in the aqueous reaction medium, the hydrogen peroxide form the aqueous reaction medium cannot return back to the surface oxidized metal film (SOMF), which also acts as a catalyst for the hydrogen peroxide decomposition. Thus, because of the presence of HPM between SOMF and the aqueous reaction medium, the catalytic decomposition of hydrogen peroxide once formed and absorbed in the aqueous reaction medium is eliminated or drastically reduced and consequently the selectivity of hydrogen peroxide formation is increased.

By the process of this invention hydrogen can be oxidized by oxygen to hydrogen peroxide with a high selectivity (above about 80%) at a very high conversion of hydrogen (85–100%) even at room temperature without the formation of an explosive gas mixture of hydrogen and oxygen or air and hence in a very safe manner.

The present invention -is described with respect to the following examples illustrating the process of this invention for the production of hydrogen peroxide by non-hazardous direct oxidation of hydrogen by oxygen using said novel hydrophobic composite Pd-membrane catalyst. These examples are provided for illustrative purposes only and are not to be construed as limitations of the process of this invention.

Definition of Terms

PVDF is polyvinylidene fluoride. EDTA is ethylene diamine tetraacetic acid. DMF is dimethyl formamide.

The concentration of metals in the metal alloy of the membrane catalyst is given on the basis of wt % of a particular metal in the metal alloy.

The rate of hydrogen permeation is defined as the amount of hydrogen permeated through the membrane of the membrane catalyst per unit surface of the membrane per unit time.

The gas hourly space velocity (GHSV) is defined as the volume of gas, measured at 0° C. and 1 atm pressure, passed through a unit volume of the membrane reactor, confined to the membrane catalyst, per hour.

The liquid hourly space velocity (LHSV) is defined as the volume of aqueous reaction medium passed through a unit volume of the membrane reactor, confined to the membrane catalyst, per hour.

The conversion of hydrogen, selectivity of hydrogen peroxide and yield of hydrogen peroxide are defined as follows:

Conversion of $H_2$ (%)=100×[$(H_2)_i$−$(H_2)_o$]/$(H_2)_i$

Selectivity of $H_2O_2$ (%)=100×[M $(H_2O_2)$]/[$(H_2)_i$−$(H_2)_o$]

Yield of $H_2O_2$ (%)=100×[M $(H_2O_2)$]/$(H_2)_i$

Wherein, $(H_2)_i$; is the moles of $H_2$ permeated through the membrane catalyst; $(H_2)_o$ is the moles of $H_2$ found unconverted in the process and; M $(H_2O_2)$ is the moles of $H_2O_2$ formed in the process.

Steady state in the reactor is attained when there is no significant change in the concentration of different components present in the reactor effluent as a function of time.

EXAMPLE-1

This example illustrates the preparation of a novel hydrophobic composite Pd-membrane catalyst having a formula: Hydrophobic PVDF membrane (2.6 g.m$^{-2}$)/PdO—Pd film (3.4 g.m$^{-2}$, thickness=0.3 $\mu$m)/Pd (89 wt %)—Ag (11 wt %) metal alloy (36.2 g.m$^{-2}$)/γ-alumina ceramic porous membrane., used in the process of this invention.

The above membrane catalyst was prepared in the following five sequential steps:

Step (i): Sensitization and activation of the inner surface of a Type G, γ-alumina ultra filtration ceramic porous membrane tube available commercially and can be obtained from Societe des Ceramiques Techniques, France, having inner diameter of 7 mm, outer diameter of 10 mm and length of 250 mm and pore size of 5 nm, was effected by closing one end of the membrane tube by a teflon cap and then contacting the inner surface of the tube for 0.5 h alternatively with 0.1 wt % stannous chloride aqueous solution and 0.1 wt % palladium chloride aqueous solution for 10 times, by filling the membrane tube with the respective solutions, and then washing with deionized water;

Step (ii): Electroless deposition of palladium and silver simultaneously on the sensitized and activated surface was carried out by contacting it with 10 ml aqueous solution containing mixed Pd-EDTA and Ag-EDTA complexes and hydrazine, as a reducing agent, prepared by dissolving a mixture of 2.0 g $PdCl_2$, 0.08 g $AgNO_3$, 34.0 g disodium salt of EDTA and 0.12 g hydrazine in one liter of 25% ammonium hydroxide solution; for a period of 2 h repeatedly for 30 times and then washing with deionized water; removing the teflon cap, drying, and then heating under nitrogen at 500° C. for 4 h, so that Pd—Ag metal alloy film is formed on the inner surface of the porous ceramic membrane tube.

Step(iii): Electroless deposition of palladium on the Pd—Ag metal alloy film was done by closing an end of the membrane tube by a teflon cap and then contacting metal alloy film with 10 ml aqueous solution, prepared by dissolving 4.0 g $PdCl_2$, 65 g disodium salt of EDTA and 0.12 g hydrazine in 1000 ml of 25% ammonium hydroxide solution, for a period of 2 h repeatedly for 3 times to form a thin film of Pd on the Pd—Ag alloy and then washing with deionized water.

Step (iv): Surface oxidation of the Pd-metal film is effected by contacting it with a column of 30% $H_2O_2$ solution for 1 h. repeatedly for 5 times, and then washing with deionized water and drying.

Step (v): Deposition of a hydrophobic polymer membrane on the surface oxidized Pd-metal film was done by contacting it with a column of non-aqueous polymer solution containing 2.0 wt % PVDF (polyvinylidene fluoride) in DMF (dimethyl formamide) solvent for 30 minutes, removing the excess solution from the membrane tube leaving a thin film of the polymer solution on the inner surface of the membrane, removing the teflon cap, and then drying the membrane tube in air at 110° C. for about 1 h to provide the membrane catalyst.

The amount of metal deposited in the electroless plating was estimated by analyzing the solutions for its metal content before the electroless deposition and after the electroless deposition.

The rate of hydrogen permeation through the membrane catalyst was measured by contacting the outer surface of the tubular membrane catalyst with $H_2$ gas at a constant pressure of 20 psig at 8° C. in a conventional tubular membrane reactor and passing continuously oxygen gas at a flow rate of 100 ml/min inside of tubular membrane catalyst at a pressure of 0.5 psig and determining the amount of $H_2$ permeated through the composite membrane catalyst by measuring a fall of $H_2$ pressure in the $H_2$ reservoir connected to the membrane reactor, through a pressure regulator, for a known period, after attaining a steady state. The fall in the pressure of $H_2$ reservoir was only due to the $H_2$ permeation through the membrane catalyst. When $H_2$ gas was replaced by pure $N_2$ there was no fall in the pressure in the $N_2$ gas reservoir for a period of 2 h, indicating that the catalyst membrane was without pinholes and also not permeable to $N_2$ gas. The rate of $H_2$ permeation through the membrane catalyst was 28 $\mu$.mol s$^{-1}$.m$^{-2}$.

EXAMPLE-2

This example illustrates the process of this invention for the production of hydrogen peroxide by the non-hazardous direct oxidation of $H_2$ by $O_2$, using the novel hydrophobic composite Pd-membrane catalyst prepared in Example-1.

The process was carried out in a membrane reactor, operated batch-wise with respect to the hydrogen gas feed and continuous with respect to both the aqueous reaction medium and the oxygen containing gas feed, without recirculation of the aqueous reaction medium.

The membrane reactor was made up of stainless steel tubular housing (inner diameter: 15 mm) suitable for fixing the membrane catalyst tube having inner diameter of 7.0 mm, outer diameter of 10 mm and length of 250 mm in a stainless steel cylindrical casing with a help of 'O' rings, providing two separate zones in the reactor separated by the membrane catalyst. The close-ended space or gap between the inner wall of the stainless steel housing and the outer wall of the membrane catalyst tube was the gas zone and the open-ended space, having a volume of 9.6 cm$^3$, confined by the inner walls of the membrane catalyst tube was the reaction medium zone of the membrane reactor. The stainless steel housing suitable for the inorganic porous membrane (IPM) ceramic tube, 7/10 mono tube of length 250 mm, was obtained from Societe des Ceramiques Techniques, BP 1-65460 Bazet—France. The temperature of the membrane reactor was controlled by immersing the membrane reactor in a constant temperature bath.

The process was carried out in the following two steps:

Step-1: After installation of the membrane catalyst tube in the membrane reactor, the membrane catalyst was first pretreated with nitrous oxide by passing it continuously through the membrane catalyst tube in the absence of any reaction medium at a space velocity of 100 h$^{-1}$ at 120° C. for a period of 5 h.

Step-2: After the nitrous oxide pretreatment to the membrane catalyst, the gas zone of the reactor is flushed with a pure hydrogen to remove air from the gas zone, and then a constant hydrogen pressure is employed to the gas zone and simultaneously an aqueous reaction medium and O$_2$ containing gas were fed continuously to the reaction medium zone of the membrane reactor, at the reaction conditions given below. The reaction medium was fed to the membrane reactor using a peristaltic pump. The amount of hydrogen permeated through the catalyst membrane tube was measured from a fall in the pressure of the H$_2$ reservoir from which the hydrogen at a constant pressure was supplied to the close ended gas zone of the membrane reactor. The hydrogen peroxide formed in the process was measured by determining its concentration in the effluent aqueous reaction medium, after attaining a steady state, by the idometric titration method.

Reaction Conditions

| | |
|---|---|
| Aqueous reaction medium | 0.02 M H$_2$SO$_4$ containing 5 ppm sodium pyrophosphate |
| Oxygen containing gas and its pressure | Pure oxygen, 1.1 atm |
| Reaction Temperature | 30° C. |
| Constant hydrogen pressure | 2.3 atm |
| LHSV of the reaction medium | 6.0 h$^{-1}$ |
| GHSV of the oxygen containing gas | 300 h$^{-1}$ |

At the above reaction conditions, the amount of hydrogen permeated through the membrane was 0.46 mmol.h$^{-1}$ and the H$_2$ conversion, H$_2$O$_2$ selectivity and H$_2$O$_2$ yield obtained were >99.5%, 83.2% and 83.0%, respectively.

EXAMPLE-3

The process of this invention was carried out using the same membrane catalyst described in Example-1 and using the same membrane reactor and procedure described in Example-2 except that the reaction conditions in step-ii of the process were different. The reaction conditions employed were as follows:

| | |
|---|---|
| Aqueous reaction medium | 0.1 M HCl containing 5 ppm sodium pyrophosphate |
| Oxygen containing gas and its pressure | Pure oxygen, 1.1 atm |
| Reaction Temperature | 25° C. |
| Constant hydrogen pressure | 1.3 atm |
| LHSV of the reaction medium | 8.0 h$^{-1}$ |
| GHSV of the oxygen containing gas | 500 h$^{-1}$ |

At the above reaction conditions, the amount of hydrogen permeated through the membrane was 0.33 mmol.h$^{-1}$ and the H$_2$ conversion, H$_2$O$_2$ selectivity and H$_2$O$_2$ yield obtained were 93.2%, 81.1% and 75.3%, respectively.

EXAMPLE-4

The process of this invention was carried out using the same membrane catalyst described in Example-1 and using the same membrane reactor and procedure described in Example-2 except that the ptreatment in step-i was carried out by passing oxygen continuously through the membrane catalyst tube in the absence of reaction medium at the space velocity of 500 h$^{-1}$ at 200° C. for a period of 2 h and also the reaction conditions in step-ii of the process were different. The reaction conditions employed were as follows:

| | |
|---|---|
| Aqueous reaction medium | 1.0 M H$_3$PO$_4$ |
| Oxygen containing gas and its pressure | Pure oxygen, 2.0 atm |
| Reaction Temperature | 2° C. |
| Constant hydrogen pressure | 4.7 atm |
| LHSV of the reaction medium | 23.5 h$^{-1}$ |
| GHSV of the oxygen containing gas | 240 h$^{-1}$ |

At the above reaction conditions, the amount of hydrogen permeated through the membrane was 0.87 mmol.h$^{-1}$ and the H$_2$ conversion, H$_2$O$_2$ selectivity and H$_2$O$_2$ yield obtained were 91.3%, 81.4% and 74.3%, respectively.

EXAMPLE-5

The process of this invention was carried out using the same membrane catalyst described in Example-1 and using the same membrane reactor and procedure described in Example-2 except that the nitrous oxide pretreatment in step-i of the process in the presence of 0.01 M H$_2$SO$_4$ fed to the reactor at a liquid hourly space velocity of 0.5 h$^{-1}$ and the reaction conditions in step-ii of the process were different. The reaction conditions employed were as follows:

| | |
|---|---|
| Aqueous reaction medium | 0.01M H$_2$SO$_4$ containing 10 ppm of triamino methylene phosphonic acid |
| Oxygen containing gas and its pressure | Air, 2.6 atm |
| Reaction Temperature | 45° C. |
| Constant hydrogen pressure | 3.0 atm |
| LHSV of the reaction medium | 0.5 h$^{-1}$ |
| GHSV of the oxygen containing gas | 805 h$^{-1}$ |

At the above reaction conditions, the amount of hydrogen permeated through the membrane was 0.56 mmol.h$^{-1}$ and the H$_2$ conversion, H$_2$O$_2$ selectivity and H$_2$O$_2$ yield obtained were 97.1%, 76.5% and 74.2%, respectively.

EXAMPLE-6

The process of this invention was carried out using the same membrane catalyst described in Example-1 and using the same membrane reactor and at the same reaction conditions, described in Example-2 except that the aqueous reaction medium was recirculated by providing an external loop connecting the membrane reactor at the inlet and outlet of the aqueous reaction medium and the reaction medium was 0.1 M $H_3PO_4$ The recirculation of the reaction medium was effected by the gas lift mechanism similar that used in the conventional external recirculation loop reactor. The results obtained were as follows:

The amount of hydrogen permeated through the membrane was 0.49 mmol.h$^{-1}$ and the $H_2$ conversion, $H_2O_2$ selectivity and $H_2O_2$ yield obtained were 99.5%, 82.5% and 82.1%, respectively.

EXAMPLE-7

The process of this invention was carried out using the same membrane catalyst described in Example-1 and using the same membrane reactor described in Example-6 except that the membrane reactor was operated batch-wise with respect to aqueous reaction medium at the following reaction conditions:

| | |
|---|---|
| Aqueous reaction medium | 0.02 M $H_2SO_4$ with 1 ppm of sodium pyrophosphate |
| Oxygen containing gas | Pure oxygen |
| Pressure of oxygen containing gas | 1.2 atm |
| Constant hydrogen pressure | 2.3 atm |
| LHSV of the reaction medium | 0.0 h$^{-1}$ (batch-wise operation with respect to the reaction medium) |
| GHSV of the oxygen containing gas | 300 h$^{-1}$ |
| Duration of the reaction | 10 h |

At the above reaction conditions the amount of hydrogen permeated through the membrane was 0.43 mmol.h$^{-1}$ and the $H_2$ conversion, $H_2O_2$ selectivity and $H_2O_2$ yield obtained were 96.5%, 73.5% and 70.1%, respectively.

EXAMPLE-8

A novel hydrophobic composite Pd-membrane catalyst used in this invention was prepared by the five sequential steps same as that described in Example-1 except that, in step-v, the Pd-metal film was contacted with a column of non aqueous solution containing 1.0 wt % silicon rubber (polydimethylsiloxane with less than 1% vinyl group) and 0.1 wt % trimethylol propane, which is a cross linking agent, in toluene solvent for 1 h, the solution was removed by draining it out from the membrane tube and then the membrane tube was heated in air at 120° C. for a period of 2 h to provide a novel hydrophobic composite Pd-membrane catalyst having formula Hydrophobic silicon rubber membrane (0.5 g.m$^{-2}$)/PdO—Pd film(3.4 g.m$^{-2}$, thickness=0.3 $\mu$m)/Pd (89 wt %)—Ag (11 wt %) metal alloy (36.2 g.m$^{-2}$)/$\gamma$-alumina ceramic porous membrane.

The rate $H_2$ permeation through the membrane catalyst, measured by the procedure same as that described in Example-1, was 28.5 $\mu$mol.s$^{-1}$m$^{-2}$. The membrane catalyst was without pinholes and permeable only to hydrogen.

EXAMPLE-9

A novel hydrophobic composite Pd-membrane catalyst used in this invention was prepared by the five sequential steps same as that described in Example-1 except that, in step-v, the Pd-metal film was contacted with a column of non aqueous solution containing 3 wt % polysulfone (mol. wt.≅26000) in DMF solvent for 1 h, the solution was removed by draining it out from the membrane tube and then the membrane tube was heated in air at 150° C. for a period of 1h to provide a novel hydrophobic composite Pd-membrane catalyst having formula: Hydrophobic Polysulfone membrane (4.1 g.m$^{-2}$)/PdO—Pd film(3.4 g.m$^{-2}$, thickness=0.3 $\mu$m)/Pd (89 wt %)—Ag (11 wt %) metal alloy (36.2 g.m$^{-2}$)/$\gamma$-alumina ceramic porous membrane.

The rate $H_2$ permeation through the membrane catalyst, measured by the procedure same as that described in Example-1, was 27.3 $\mu$mol.s$^{-1}$m$^{-2}$. The membrane catalyst was without pinholes and permeable only to hydrogen.

EXAMPLE-10

A novel hydrophobic composite Pd-membrane catalyst used in this invention was prepared by the five sequential steps same as that described in Example-8 except that, the concentration of silicon rubber and trimethylol propane is changed from 1 wt % to 5 wt % and from 0.1 wt % to 0.5 wt %, respectively, and also repeating the step-v for 3 times to provide a novel hydrophobic composite Pd-membrane catalyst having formula Hydrophobic silicon rubber membrane (14.5 g.m$^{-2}$)/PdO—Pd film(3.4 g.m$^{-2}$, thickness=0.3 $\mu$m)/Pd (89 wt %)–Ag (11 wt %) metal alloy (36.2 g.m$^{-2}$)/$\gamma$-alumina ceramic porous membrane.

The rate $H_2$ permeation through the membrane catalyst, measured by the procedure same as that described in Example-1, was 26.5 $\mu$mol.s$^{-1}$m$^{-2}$. The membrane catalyst was without pinholes and permeable only to hydrogen.

EXAMPLE-11

A novel hydrophobic composite Pd-membrane catalyst used in this invention was prepared by the five sequential steps of the process of this invention, out of which, step-i, iii,iv and v are exactly same as that described in Example-1 and the second step (step-ii) was as follows:

Step-(ii):Electroless deposition of palladium and silver alternatively on the sensitized and activated surface was effected by contacting it alternatively with a Pd-plating solution, prepared by dissolving 4.3 g PdCl$_2$, 65 g disodium salt of EDTA and 0.12 g hydrazine in 1000 ml 25% ammonium hydroxide solution, for a period of 2 h, and with a Ag-plating solution prepared by dissolving 4.9 g AgNO$_3$, 65.0 g disodium salt of EDTA and 0.12 g hydrazine in a 1000 ml 25% ammonium hydroxide solution, for a period 2 h, and repeating the alternate deposition of Pd and Ag, until the amount of Pd and Ag deposited on the membrane tube was 0.64 g and 0.23 g, respectively, The Pd—Ag metal deposited membrane tube was then heated in nitrogen at 600° C. for 2 h, so that Pd—Ag metal alloy film is formed on the inner surface of the membrane tube.

The formula or composition of the resulting catalyst was Hydrophobic PVDF membrane (2.6 g.m$^{-2}$)/PdO—Pd film (3.4 g.m$^{-2}$, thickness=0.3 $\mu$m)/Pd (74 wt %)—Ag (26 wt %) metal alloy (195 g.m$^{-2}$)/$\gamma$-alumina ceramic porous membrane.

The rate $H_2$ permeation through the membrane catalyst, measured by the procedure same as that described in Example-1, was 19.6 $\mu$mol.s$^{-1}$m$^{-2}$. The membrane catalyst was without pinholes and permeable only to hydrogen.

EXAMPLE-12

A novel hydrophobic composite Pd-membrane catalyst used in this invention was prepared by the five sequential steps as that described in Example-11 except that, in step-i, instead of a Type-G γ-alumina ultrafiltration ceramic porous membrane tube, a Type-A α-alumina microfiltration ceramic porous membrane tube with a pore size of 200 nm, was used as a porous inorganic ceramic membrane support for the membrane catalyst and, also in step-ii the amount of Pd and Ag deposited was different.

The formula/composition of the resulting catalyst was Hydrophobic PVDF membrane (2.6 g.m$^{-2}$)/PdO—Pd film (3.3 g.m$^{-2}$, thickness=0.3 $\mu$m)/Pd (71 wt %)—Ag (29 wt %) metal alloy (221 g.m$^{-2}$)/α-alumina ceramic membrane tube.

The rate H$_2$ permeation through the membrane catalyst at 30° C., measured by the procedure same as that described in Example-1, was 27.5 $\mu$mol.s$^{-1}$m$^{-2}$. The membrane catalyst was without pinholes and permeable only to hydrogen.

EXAMPLE-13

A novel hydrophobic composite Pd-membrane catalyst used in this invention was prepared by the five sequential steps same as that described in Example-1 except that, in step-i, instead of a Type G γ-alumina ultrafiltration ceramic porous membrane tube, a Type-Z zirconia ultrafiltration ceramic porous membrane tube with a pore size of 20 nm, was used as a porous support for the membrane catalyst and, in step-ii, instead of 0.08 g AgNO$_3$, 0.03 g AgNO$_3$, was used in the preparation of the membrane catalyst.

The formula/composition of the resulting catalyst was Hydrophobic PVDF a membrane (2.6 g.m$^{-2}$)/PdO—Pd film (3.3 g.m$^{-2}$, thickness=0.3 $\mu$m)/Pd(95 wt %)—Ag (5 wt %) metal alloy (71 g.m$^{-2}$)/zirconia ceramic porous membrane.

The rate H$_2$ permeation through the membrane catalyst at 30° C., measured by the procedure same as that described in Example-1, was 36 $\mu$mol.s$^{-1}$m$^{-2}$. The membrane catalyst was without pinholes and permeable only to hydrogen.

EXAMPLE-14

A novel hydrophobic composite Pd-membrane catalyst used in this invention was prepared by the five sequential steps same as that described in Example-12 except that, in step-iii, the electroless deposition of Pd was done repeatedly for 15 times.

The formula/composition of the resulting catalyst was Hydrophobic PVDF membrane (2.6 g.m$^{-2}$)/PdO—Pd film (12.8 g.m$^{-2}$, thickness=11 $\mu$m)/Pd (71 wt %)—Ag (29 wt %) metal alloy (221 g.m$^{-2}$)/α-alumina ceramic membrane tube.

The rate H$_2$ permeation through the membrane catalyst at 30° C., measured by the procedure same as that described in Example-1, was 22.5 $\mu$mol.s$^{-1}$m$^{-2}$. The membrane catalyst was without pinholes and permeable only to hydrogen.

EXAMPLE-15

A novel hydrophobic composite Pd-membrane catalyst used in this invention was prepared by the five sequential steps same as that described in Example-1, except that in step-ii, instead of a mixture of 2.0 g PdCl$_2$, 0.08 g AgNO$_3$, 34 g disodium salt of EDTA and 0.12 g hydrazine, a mixture of 1.8 g PdCl$_2$, 0.15 g RuCl$_3$, 0.1 g PtCl$_4$, 0.02 g AuCl$_3$, 0.06 g AgNO$_3$, 35.0 g disodium salt of EDTA and 0.15 g hydrazine was used.

The formula/composition of the resulting catalyst was Hydrophobic PVDF membrane (2.6 g.m$^{-2}$)/PdO—Pd film (3.4 g.m$^{-2}$, thickness 0.3 $\mu$.m)/Pd (81%) Ru (5%) Pt (3.5%) Au (4%) Ag (6.5%) metal alloy (41.1 g.m$^{-2}$)/γ-alumina ceramic porous membrane.

The rate H$_2$ permeation through the membrane catalyst at 30° C., measured by the procedure same as that described in Example-1, was 25.7 $\mu$mol.s$^{-1}$m$^{-2}$. The membrane catalyst was without pinholes and permeable only to hydrogen.

EXAMPLE-16

A novel hydrophobic composite Pd-membrane catalyst used in this invention was prepared by the five sequential steps same as that described in Example-14, except that, in step-iv, instead of contacting the Pd metal film with 30% H$_2$O$_2$, the Pd film was contacted with 0,1 molar aqueous perchloric acid (HClO$_4$) for 1 minute, the acid solution was drained out and the membrane tube was heated slowly up to 300° C. and cooled to room temperature. This procedure was repeated for three times.

The rate H$_2$ permeation through the membrane catalyst at 30° C., measured by the procedure same as that described in Example-1, was 23.6 $\mu$mol.s$^{-1}$m$^{-2}$. The membrane catalyst was without pinholes and permeable only to hydrogen.

EXAMPLE-17

A novel hydrophobic composite Pd-membrane catalyst used in this invention was prepared by the five sequential steps same as that described in Example-14, except that, in step-iv, instead of contacting the Pd metal film with 30% H$_2$O$_2$, the Pd film was contacted with nitrous oxide (N$_2$O) gas by passing 10 mol % N$_2$O in nitrogen over the Pd-film at 280° C. for 3 h.

The rate H$_2$ permeation through the membrane catalyst at 30° C., measured by the procedure same as that described in Example-1, was 24.1 $\mu$mol.s$^{-1}$m$^{-2}$. The membrane catalyst was without pinholes and permeable only to hydrogen.

EXAMPLE-18

The process of this invention was carried out using the membrane catalyst described in Example-8 and using the same membrane reactor and procedure described in Example-2 except that the reaction conditions in step-ii of the process were different. The reaction conditions employed were as follows:

| | |
|---|---|
| Aqueous reaction medium | 0.02 M H$_2$SO$_4$ containing 5 ppm sodium pyrophosphate |
| Oxygen containing gas and its pressure | Pure oxygen, 1.5 atm |
| Reaction Temperature | 29° C. |
| Constant hydrogen pressure | 2.5 atm |
| LHSV of the reaction medium | 6.0 h$^{-1}$ |
| GHSV of the oxygen containing gas | 305 h$^{-1}$ |

At the above reaction conditions, the amount of hydrogen permeated through the membrane was 0.51 mmol.h$^{-1}$ and the H$_2$ conversion, H$_2$O$_2$ selectivity and H$_2$O$_2$ yield obtained were 99.6%, 82.9% and 82.8%, respectively.

EXAMPLE-19

The process of this invention was carried out using the membrane catalyst described in Example-9 and using the same membrane reactor and procedure described. in Example-7 except that the reaction conditions in step-ii of the process were different. The reaction conditions employed were as follows:

| | |
|---|---|
| Aqueous reaction medium | 0.1 M HCl containing 5 ppm sodium pyrophosphate |
| Oxygen containing gas and its pressure | Pure oxygen, 1.3 atm |
| Reaction Temperature | 25° C. |
| Constant hydrogen pressure | 2.0 atm |
| LHSV of the reaction medium | 6.0 h$^{-1}$ |
| GHSV of the oxygen containing gas | 405 h$^{-1}$ |

At the above reaction conditions, the amount of hydrogen permeated through the membrane was 0.39 mmol.h$^{-1}$ and the $H_2$ conversion, $H_2O_2$ selectivity and $H_2O_2$ yield obtained were 94.6%, 81.3% and 76.9%, respectively.

EXAMPLE-20

The process of this invention was carried out using the membrane catalyst described in Example-10 and using the same membrane reactor and procedure described in Example-7 except that the reaction conditions in step-ii of the process were different. The reaction conditions employed were as follows:

| | |
|---|---|
| Aqueous reaction medium | 0.02 M $H_2SO_4$ containing 5 ppm sodium pyrophosphate |
| Oxygen containing gas and its pressure | Pure oxygen, 1.1 atm |
| Reaction Temperature | 28° C. |
| Constant hydrogen pressure | 2.3 atm |
| LHSV of the reaction medium | 0.0 h$^{-1}$ |
| GHSV of the oxygen containing gas | 305 h$^{-1}$ |
| Duration of reaction period | 25 h |

At the above reaction conditions, the amount of hydrogen permeated through the membrane was 0.38 mmol.h$^{-1}$ and the $H_2$ conversion, $H_2O_2$ selectivity and $H_2O_2$ yield obtained were 92.5%, 76.9% and 71.1%, respectively.

EXAMPLE-21

The process of this invention was carried out using the membrane catalyst described in Examples-11 and using the same membrane reactor, reaction conditions and procedure described in Example-2. The amount of hydrogen permeated was 0.31 mmol h$^{-1}$ and the $H_2$ conversion, $H_2O_2$ selectivity and $H_2O_2$ yield obtained were 99.6%, 82.6% and 82.5%, respectively.

EXAMPLE-22

The process of this invention was carried out using the membrane catalyst described in Example-12 and using the same membrane reactor and procedure described in Example-2 except that the reaction conditions in step-ii of the process were different. The reaction conditions employed were as follows:

| | |
|---|---|
| Aqueous reaction medium | 0.02 M HCl containing 5 ppm sodium pyrophosphate |
| Oxygen containing gas and its pressure | Pure oxygen, 1.1 atm |
| Reaction Temperature | 50° C. |
| Constant hydrogen pressure | 2.3 atm |
| LHSV of the reaction medium | 5.0 h$^{-1}$ |
| GHSV of the oxygen containing gas | 705 h$^{-1}$ |

At the above reaction conditions, the amount of hydrogen permeated through the membrane was 0.42 mmol.h$^{-1}$ and the $H_2$ conversion, $H_2O_2$ selectivity and $H_2O_2$ yield obtained were >99.5%, 77.5% and 77.5%, respectively.

EXAMPLE-23

The process of this invention was carried out using the membrane catalyst described in Example-13 and using the same membrane reactor and procedure described in Example-6 except that the reaction conditions in step-ii of the process were different. The reaction conditions employed were as follows:

| | |
|---|---|
| Aqueous reaction medium | 0.05 M $H_2SO_4$ containing 20 ppm sodium pyrophosphate |
| Oxygen containing gas and its pressure | Pure oxygen, 1.2 atm |
| Reaction Temperature | 25° C. |
| Constant hydrogen pressure | 2.4 atm |
| LHSV of the reaction medium | 7.2 h$^{-1}$ |
| GHSV of the oxygen containing gas | 350 h$^{-1}$ |

At the above reaction conditions, the amount of hydrogen permeated through the membrane was 0.56 mmol.h$^{-1}$ and the $H_2$ conversion, $H_2O_2$ selectivity and $H_2O_2$ yield obtained were 88.5%, 79.8% and 70.6%, respectively.

EXAMPLE-24

The process of this invention was carried out using the membrane catalyst described in Example-14 and using the same membrane reactor, reaction conditions and procedure described in Example-22. The amount of hydrogen permeated through the membrane was 0.39 mmol.h$^{-1}$ and the $H_2$ conversion, $H_2O_2$ selectivity and $H_2O_2$ yield obtained were 97.5%, 79.8% and 77.8%, respectively.

EXAMPLE-25

The process of this invention was carried out using the membrane catalyst described in Example-15 and using the same membrane reactor, reaction conditions and procedure described in Example-2.

The amount of hydrogen permeated through the membrane was 0.37 mmol.h$^{-1}$ and the $H_2$ conversion, $H_2O_2$ selectivity and $H_2O_2$ yield obtained were 89.8%, 78.5% and 70.5%, respectively.

EXAMPLE-26

The process of this invention was carried out using the membrane catalyst described in Example-16 and using the same membrane reactor, reaction conditions and procedure described in Example-24.

The amount of hydrogen permeated through the membrane was 0.37 mmol.h$^{-1}$ and the $H_2$ conversion, $H_2O_2$ selectivity and $H_2O_2$ yield obtained were 91.5%, 77.9% and 71.2%, respectively.

EXAMPLE-27

The process of this invention was carried out using the membrane catalyst described in Example-17 and using the same membrane reactor and procedure described in Example-2.

The amount of hydrogen permeated through the membrane was 0.36 mmol.h$^{-1}$ and the $H_2$ conversion, $H_2O_2$ selectivity and $H_2O_2$ yield obtained were 94.5%, 71.5% and 67.6%, respectively.

EXAMPLE-28

This is a comparative example which illustrates the importance of the pretreatment in step-i of the process of this invention.

The process of this invention was carried out using the same membrane catalyst and also the same membrane reactor and reaction conditions and procedure described in Example-2 except that the nitrous oxide pretreatment in step-i of the process was eliminated.

The results obtained were as follows. The amount of hydrogen permeated through the membrane was 0.45 mmol.h$^{-1}$ and the $H_2$ conversion, $H_2O_2$ selectivity and $H_2O_2$ yield obtained were 99.4%, 65.1% and 64.7%, respectively.

EXAMPLE-29

This comparative example illustrates the importance of the presence of surface oxidized metal film (SOMF) in the novel hydrophobic composite Pd-membrane catalyst used in the process of this invention.

The process was carried out using the same membrane catalyst described in Example-14 and the same membrane reactor, procedure and process conditions described in Example-28 except that the membrane catalyst did not contain the surface oxidized metal film (SOMF).

The results obtained were as follows. The amount of hydrogen permeated through the membrane was 0.46 mmol.h$^{-1}$ and the $H_2$ conversion, $H_2O_2$ selectivity and $H_2O_2$ yield obtained were 100%, 0.8% and 0.8%, respectively.

A comparison of the results of the Example-24 with these results clearly shows that the presence of SOMF is very essential for obtaining high selectivity or yield of $H_2O_2$ in the direct oxidation of hydrogen by oxygen to $H_2O_2$.

EXAMPLE-30

This comparative example illustrates the importance of the surface oxidation of the metal film comprising palladium present in the novel hydrophobic composite Pd-membrane catalyst used in the process of this invention.

The process was carried out using the same membrane catalyst, membrane reactor, procedure and process conditions described in Example-2 except that the surface oxidation of the Pd-metal film present in the membrane catalyst was not effected while preparing the membrane catalyst and also the pretreatment step (step-i) of the process of this invention was eliminated.

The results obtained were as follows. The amount of hydrogen permeated through the membrane was 0.47 mmol.h$^{-1}$ and the $H_2$ conversion, $H_2O_2$ selectivity and $H_2O_2$ yield obtained were 98.3%, 43.5% and 42.8%, respectively.

A comparison of the results of the Example-2 with these results clearly shows that the surface oxidation of the Pd-metal film during the catalyst preparation and/or in the pretreatment step of the process of this invention is very essential for obtaining high selectivity or yield of $H_2O_2$ in the direct oxidation of hydrogen by oxygen to $H_2O_2$.

EXAMPLE-31

The comparative example illustrates the importance of the presence of hydrophobic polymer membrane (HPM) in the novel hydrophobic composite Pd-membrane catalyst used in the process of this invention.

The process was carried out using the same membrane catalyst, membrane reactor, procedure, and process conditions described in Example-2 except that the membrane catalyst did not contain the hydrophobic polymer membrane (Hydrophobic PVDF membrane).

The results obtained were as follows. The amount of hydrogen permeated through the membrane was 0.47 mmol.h$^{-1}$ and the $H_2$ conversion, $H_2O_2$ selectivity and $H_2O_2$ yield obtained were 99.6%, 55.6% and 55.4%, respectively.

A comparison of the results of the Example-2 with these results clearly shows that the presence of hydrophobic polymer membrane (HPM) is necessary for obtaining high selectivity and yield of $H_2O_2$ in the direct oxidation of hydrogen by oxygen to $H_2O_2$.

Novel Features and Advantages of the Process of this Invention Over the Prior Art Processes for the Production of Hydrogen Peroxide by the Direct Oxidation of Hydrogen by Oxygen to Hydrogen Peroxide 1) In case of the prior art processes for the direct oxidation of hydrogen by oxygen to hydrogen peroxide over hydrophillic or hydrophpobic Pd-containing catalyst in a high pressure slurry reactor, the hydrogen and oxygen feed gases, both dissolved simultaneously in an aqueous solution, react on the catalyst surface and there is a possibility of the presence of an explosive gaseous mixture of hydrogen and oxygen, which can be highly hazardous. On the contrary, in case of the composite Pd-membrane catalyst of this invention, during its use in the direct oxidation of hydrogen by oxygen to hydrogen peroxide, there is no mixing of $H_2$ and $O_2$ feed gases or no formation of gaseous explosive mixture of $H_2$ and $O_2$ because the hydrogen permeated through the composite membrane in a form of atomic hydrogen reacts with the molecular oxygen, dissolved in an aqueous solution, on the surface oxidized metal film of the membrane catalyst, and hence there is no possibility of the formation of an explosive gas mixture of $H_2$ and $O_2$ or air during the direct oxidation of hydrogen by oxygen to hydrogen peroxide, making the process non-hazardous and safe to operate.

2) As compared to the Pd-membrane catalyst based process known in the prior art for the direct oxidation of $H_2$ to $H_2O_2$, the membrane process of this invention has following novel features and advantages:

(i) Because of the use of inorganic porous membrane (IPM) as a support, said membrane catalyst is robust and has a high mechanical strength even though the metal alloy and surface oxidized metal film comprising palladium in said membrane catalyst are much thinner.

(ii) Because of the very small thickness of the metal alloy and surface oxidized metal films deposited on the inorganic porous membrane support, the rate of hydrogen permeation through said membrane catalyst is much larger and consequently the production of hydrogen peroxide is much higher.

(iii) Because of the deposition of surface oxidized metal film on the metal alloy containing Pd, said membrane catalyst is more selective for the formation of $H_2O_2$ in the direct oxidation of hydrogen as palladium oxide is more selective than palladium metal or the metal alloy containing palladium. The pretreatment in step-i of the process of this invention ensures the complete'surface oxidation of the metal film.

(iv) Because of the deposition of a thin film of a hydrophobic polymer membrane, which separates the aqueous reaction medium and the catalytically active surface oxidized metal film of said membrane catalyst to avoid a direct contact between the aqueous reaction medium containing $H_2O_2$ and the catalytically active surface of said membrane catalyst, the selectivity of said membrane catalyst for the formation of $H_2O_2$ in the direct oxidation of hydrogen is much higher. The $H_2O_2$ formed in the direct oxidation of $H_2$ over the surface oxidized metal film is absorbed in the aqueous reaction medium due to the strong affinity of $H_2O_2$ to water, and once absorbed the $H_2O_2$ cannot return back to the surface oxidized metal film and thereby avoiding its catalytic decomposition to water and oxygen and consequently the selectivity of the formation of $H_2O_2$ in the direct oxidation of hydrogen is increased.

What is claimed is:

1. A process for the production of hydrogen peroxide by the non-hazardous direct oxidation of hydrogen by oxygen, without the formation of an explosive $H_2$ and $O_2$ gas mixture, using a novel tubular hydrophobic composite Pd-membrane catalyst, represented by a formula:

$$HPM(c)/SOMF(b)/M_xPd_{1-x}(a)/IPM$$

wherein, IPM is an inorganic porous membrane, permeable to all gases and vapors, in a form of tube having a thickness of at least 0.5 mm and internal diameter of at least 0.6 cm; $M_xPd_{1-x}$ is a metal alloy, permeable only to hydrogen gas, deposited on the inner side of IPM: Pd is a palladium metal; M is a metal other than palladium, or a mixture of two or more metals; x is a mole fraction of the metal M in the metal alloy ($M_xPd_{1-x}$) in the range from about 0.03 to about 0.6; (a) is the weight of the metal alloy per unit area of IPM in the range from about 5.0 g.m$^{-2}$ to about 500 g.m$^{-2}$; SOMF is a surface oxidized thin metal film comprising palladium which is permeable only to hydrogen, deposited on the metal alloy ($M_xPd_{1-x}$); (b) is the thickness of SOMF in the range from about 0.05 $\mu$m to about 5.0 $\mu$m; HPM is a hydrophobic polymer membrane permeable to hydrogen and oxygen gases and also to vapors of water and hydrogen peroxide but not to liquid water or aqueous solution; and (c) is the weight of the HPM per unit area of SOMF in the range from about 0.2 g.m$^{-2}$ to about 40 g.m$^{-2}$; said process being conducted in a membrane reactor comprising two zones: a gas zone and a liquid medium zone, separated from each other by the membrane catalyst; the said process comprising i) pretreating in situ the tubular hydrophobic composite Pd-membrane catalyst from its hydrophobic polymer membrane (HPM) side with a gaseous oxidizing agent selected from the group consisting of oxygen, nitrous oxide, $H_2O_2$ vapors and mixtures thereof, at a temperature below about 200° C. for a period at least about 0.5 h;

ii) contacting simultaneously 1) a hydrogen gas, at a pressure above 1.0 atm, from the gas zone of the membrane reactor with the tubular composite membrane catalyst from its IPM (inorganic porous membrane) side and 2) an aqueous reaction medium which is an aqueous solution comprising a mineral acid, while bubbling continuously an oxygen containing gas at a gas hourly space velocity in the range from about 10 h$^{-1}$ to about 10,000 h$^{-1}$ at a pressure above 1.0 atm, with the tubular composite membrane catalyst from its HPM (hydrophobic polymer membrane) side, in two separate compartments separated by the tubular composite membrane catalyst, which is permeable only to hydrogen, such that the pressure drop across the tubular composite membrane catalyst is less than 5.0 atm, in the membrane reactor comprising single or optionally multiple membrane catalyst tubes, operating the membrane reactor as a batch reactor with respect to the aqueous reaction medium with an external recirculation of the aqueous reaction medium in the membrane reactor for a period more than about 1.0 h or optionally operating the membrane reactor as a continuous flow reactor with respect to the aqueous reaction medium at a liquid hourly space velocity in the range from about 0.01 h$^{-1}$ to about 100 h$^{-1}$, optionally with external recirculation of the aqueous reaction medium, at a temperature below about 75° C., such that the hydrogen permeated through the composite Pd-membrane catalyst reacts with the dissolved oxygen from the aqueous reaction medium on the surface of palladium oxide at the interface between SOMF and HPM of the composite Pd-membrane catalyst to produce hydrogen peroxide, which is absorbed in the aqueous reaction medium, producing and aqueous hydrogen peroxide solution.

2. A process as claimed in claim 1, wherein M is a metal selected from the group consisting of copper, silver, gold, ruthenium, noble metals other than palladium, and mixtures thereof.

3. A process as claimed in claim 1, wherein the mineral acid used in the aqueous reaction medium is selected from the group consisting of $H_2SO_4$, HCl, $HNO_3$, $HClO_4$ and $H_3PO_4$.

4. A process as claimed in claim 1, wherein the concentration of the mineral acids used in the aqueous reaction medium is in the range of 0.005M to 1.0M.

5. A process as claimed in claim 1, wherein the aqueous reaction medium comprises stabilizers selected from the group consisting of tri-amino methylene phosphonic acid, 1-hydroxyetylidene-1,1-di phosphonic acid, ethylene diamine tetra methylene phosphonic acid or their sodium salt and sodium pyrophosphate.

6. A process as claimed in claim 5, wherein the concentration of the stabilizers in the aqueous reaction medium is below about 100 ppm.

7. A process as claimed in claim 1, wherein the gas hourly space velocity of the oxygen containing gas is in the range of 50 h$^{-1}$ to 1000 h$^{-1}$.

8. A process as claimed in claim 1, wherein the gas hourly space velocity of the oxygen containing gas is in the range of 200 h$^{-1}$ to 820 h$^{-1}$.

9. A process as claimed in claim 1, wherein the oxygen containing gas is selected from the group consisting of pure oxygen, air and oxygen enriched air.

10. A process as claimed in claim 1, wherein the pressure drop across the composite membrane catalyst is less than 3 atm.

11. A process as claimed in claim 1, wherein the reaction temperature is in the range of 2 to 50° C.

12. A process as claimed in claim 1, wherein the membrane is operated with respect to the liquid medium at the liquid hourly space velocity of the reaction medium is in the range of 0.1 h$^{-1}$ to 10.0 $^{-1}$.

13. A process as claimed in claim 1, wherein the hydrogen is oxidized by oxygen to hydrogen peroxide with a high selectivity of greater than 75% at a very high conversion of hydrogen of between 85–99.8% without the formation of an explosive mixture.

14. A process as claimed in claim 1 wherein the membrane reactor comprises a stainless steel tubular housing (inner diameter: 15 mm) suitable for fixing the membrane catalyst tube having inner diameter of 7.0 mm, outer diameter of 10 mm and length of 250 mm in a stainless steel cylindrical casing with 'O' rings, providing two separate zones in the reactor separated by the membrane catalyst; a close-ended space or gap between an inner wall of the stainless steel housing and an outer wall of the membrane catalyst tube being the gas zone and the open-ended space having a volume of 9.6 cm$^3$, confined by the inner walls of the membrane catalyst tube being the reaction medium zone of the membrane reactor; the stainless steel housing suitable for the inorganic porous membrane (IPM) ceramic tube, 7/10 mono tube of length 250 mm; and the temperature of the membrane reactor being controlled by immersing the membrane reactor in a constant temperature bath.

* * * * *